United States Patent [19]
de Vries

[11] 4,024,479
[45] May 17, 1977

[54] HF SIGNAL TRANSMISSION DEVICE

[75] Inventor: Thijs Jisse de Vries, Eindhoven, Netherlands

[73] Assignee: U.S. Philips Corporation, New York, N.Y.

[22] Filed: Oct. 16, 1975

[21] Appl. No.: 623,000

[30] Foreign Application Priority Data

Nov. 7, 1974 Netherlands .................. 7414505

[52] U.S. Cl. .................................. 333/8; 333/12; 333/24 R; 333/70 R
[51] Int. Cl.² .................. H03H 7/02; H03H 7/14; H03H 7/46; H04B 3/56
[58] Field of Search ........... 333/70 R, 79, 77, 70 S, 333/78, 12, 1, 6, 10, 24 R; 336/181; 321/9 R, 10; 179/170 R, 170 D, 170 E, 170 J, 172; 330/124 R, 125, 126, 199; 328/26

[56] References Cited

UNITED STATES PATENTS

| | | | |
|---|---|---|---|
| 1,897,249 | 2/1933 | Fleming | 333/79 X |
| 2,700,129 | 1/1955 | Guanella | 333/24 R |
| 2,777,998 | 1/1957 | Shepherd | 333/79 X |
| 3,665,125 | 5/1972 | Valbonesi | 179/170 R |
| 3,683,271 | 8/1972 | Kobayashi | 336/181 |
| 3,731,234 | 5/1973 | Collins | 333/1 |

Primary Examiner—Alfred E. Smith
Assistant Examiner—Marvin Nussbaum
Attorney, Agent, or Firm—Frank R. Trifari; George B. Berka

[57] ABSTRACT

HF signal transmission device comprising a HF transmission path and an LF supply current transmission path connected between common input and output terminals. The LF transmission path is provided with a blocking inductance for the HF signals which, to avoid hum modulation, comprises a series of at least two coil pairs wound on an open magnetizable core, the coils in each pair being wound in opposite sense, and the LF supply current being tapped from the junction point between the two pairs.

4 Claims, 4 Drawing Figures

HF SIGNAL TRANSMISSION DEVICE

The invention relates to a HF signal transmission device comprising a HF signal transmission path and an LF alternating current transmission path, the latter transmission path being provided with at least one blocking inductance for the HF signals, which inductance comprises a coil wound on a non-closed core of magnetizable material.

Such signal transmission devices may, for example be used in aerial systems in which HF signals, for example radio and TV signals, are transported via cable connections and amplifiers and in which the power supply for these amplifiers is passed through the same cable connections.

As practice has taught that direct current power supply results in a high degree of corrosion of the cables, alternating current power supplies are increasingly introduced having — for practical reasons — a frequency which is equal to the actual mains frequency (for example 50 Hz).

In the known signal transmission devices the supply current is separated from the HF signals by means of a blocking inductance for the HF signals, comprising a coil wound on a non-closed core of magnetizable material. This blocking inductance forms for the HF signals (5 MHz and higher) a sufficiently large impedance to permit effective separation of the LF supply current from the HF signals.

For direct current supply this separation system was satisfactory. However, for alternating current supply an undesired side-effect is caused: the HF signals are modulated in the frequency rhythm of the alternating current supply; hum modulation occurs. This modulation is the result of nonlinearities because the LF alternating current causes hysteresis effects in the magnetic material of the core.

An obvious solution would be to remove the core from the coil so that non-linearities owing to saturation phenomena and accordingly hum modulation cannot occur.

However, this leads to a considerable decrease in the impedance for the HF signals, so that the coil — to maintain the original impedance — must be provided with considerably more turns. As a consequence the size of the coil is enlarged to such a degree that this may cause problems for the building-in of the coil, whilst the production is no longer economically justified.

An object of the present invention is to eliminate at a sufficiently high impedance for the HF signals the hum modulation without enlarging the coil size and the invention is characterized in that the coil consists of several coil parts, wound on a non-closed core of magnetizable material, the magnetic fields of these parts produced by the LF alternating current substantially cancelling one another at least in part of the core.

The solution according to the invention uses the frequency-dependent leakage properties of the magnetic fields produced in the non-closed core of magnetizable material by by the current in the coil parts. At low frequencies the magnetic field lines in the core will oppose each other to such a degree that, when the coil parts and the currents flowing through them are correctly dimensioned, saturation phenomena cannot occur so that no hum moduation is produced.

At higher frequencies, however, an increasing number of field lines will pass the core material only partly, inter alia because the magnetic conductance will diminish when the frequency increases. These leakage phenomena effect the occurrence of areas in the core where substantially no, or at least much less, compensation of opposing magnetic fields which are caused by the various coil parts will occur. The original blocking inductance must therefore be considered as a series circuit of a number of smaller inductances which are not, or substantially not, magnetically coupled. With a correct proportioning of the coil parts they form a sufficiently high impedance for the HF signals to guarantee effective separation between the supply currents and the HF signals.

The invention will be explained with reference to the figures in the drawings, in which.

Figure 1:
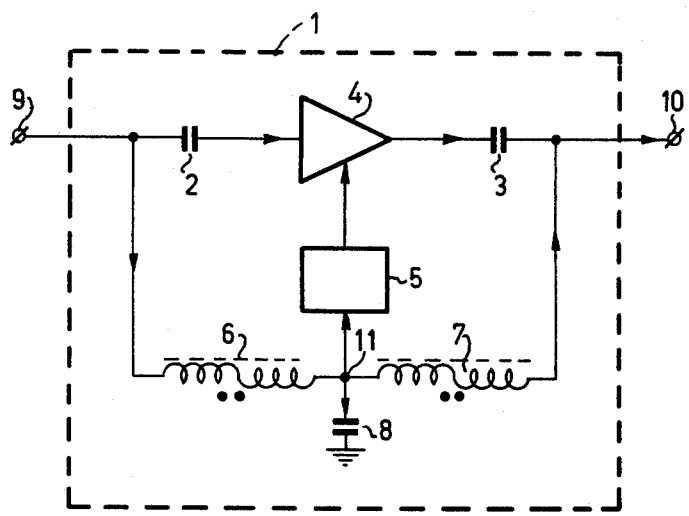
FIG. 1 shows a first embodiment of a HF signal transmission device according to the invention, this device comprising a community aerial amplifier.

The embodiment according to FIG. 1 shows a HF signal transmission device 1 having an input terminal 9 and an output terminal 10. The HF transmission path is formed in this embodiment by a capacitor 2, a HF amplifier 4 and a capacitor 3. Connected in parallel with this HF transmission path is an LF supply path comprising inductances 6 and 7. In their junction 11 current is tapped with which the amplifier 4 is supplied via a supply unit 5. In junction 11 any not fully attenuated HF signals are short-circuited to earth via a capacitor 8.

To the terminal 9 the HF signal is supplied together with the LF supply, preferably through coaxial cables. The LF supply current sees the capacitor 2 as a large impedance, so that to the input of the amplifier 4 substantially only the HF signal is applied which after amplification is passed, to the output terminal 10 via the capacitor 3. The HF signal sees the inductance 6 as a large impedance so that practically exclusively the LF supply current appears in junction 11. A part of the LF supply current is used for feeding the amplifier 4 and is rectified for that purpose in the supply unit 5 and thereafter supplied to the amplifier 4. The remaining part of the LF supply current in point 11 is added to the amplified HF signal at the terminal 10 via an inductance 7 which is constructed in the same manner as the inductance 6.

It is obvious that owing to the symmetrical construction of the LF supply path the LF supply current can also flow in the opposite direction i.e. it can be supplied to the terminal 10 and discharged via the terminal 9.

It is also possible to apply an external power supply at point 11 at which the terminals 9 and 10 act as output terminals for the LF supply current.

Figure 1A:
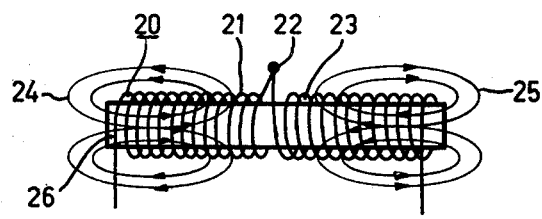
FIG. 1A shows an inductance as used in the embodiment of the HF signal transmission device shown in the FIGS. 1 and 2.

A more detailed drawing of the identical inductances 6 and 7 is shown in FIG. 1A. The inductance is formed by a coil 20 wound on a core 26, the coil consisting of a coil half 21 and a coil half 23 which are wound in opposite senses and which are interconnected in a point 22. In a practical embodiment of an inductance according to FIG. 1A the cylindrical core is made of Ferroxcube type 4B, and has a diameter of 4.4 mm and a length of 21.2 mm. The coil halves 21 and 23 are made of insulated copper wire having a diameter of 0.63 mm, each coil half consisting of twelve turns.

At low frequencies of the current through the coil 20 the magnetic field produced by the current in coil half 21 has a sense opposite to that of the magnetic field produced by the current in the coil half 23. The fields of the two coil halves will oppose each other in the core so that the maximum magnetic flux in the core is small and magnetic saturation of the core and consequently the occurrence of hum modulation is avoided. However, the inductance at the higher (signal) frequencies remains sufficiently large as will be clear from what follows hereafter.

At higher frequencies, owing to the HF coil current in the coil halves 21 and 23 and the above-mentioned frequency-dependent leakage phenomena in the magnetic material of the core, the opposite directed magnetic fields will for the greater part not cancel each other, so that locally magnetic fluxes will remain of such a magnitude that the impedance of the coil is still sufficiently large at these frequencies. In FIG. 1A the high-frequency magnetic fields are represented by the field lines 24 and 25. It is clear that the compensation of the opposing magnetic fields is largest near the point 22. At these higher frequencies the inductance must be considered as a series circuit of the inductance of the left-hand turns of the coil half 21 and of that of the right-hand turns of the coil half 23.

A similar action is of course also obtained when both coil halves 21 and 23 are wound in the same sense, when the two right-hand ends are interconnected and when the two left-hand ends of the coil halves are used for supplying and discharging of the current respectively.

Figure 2:
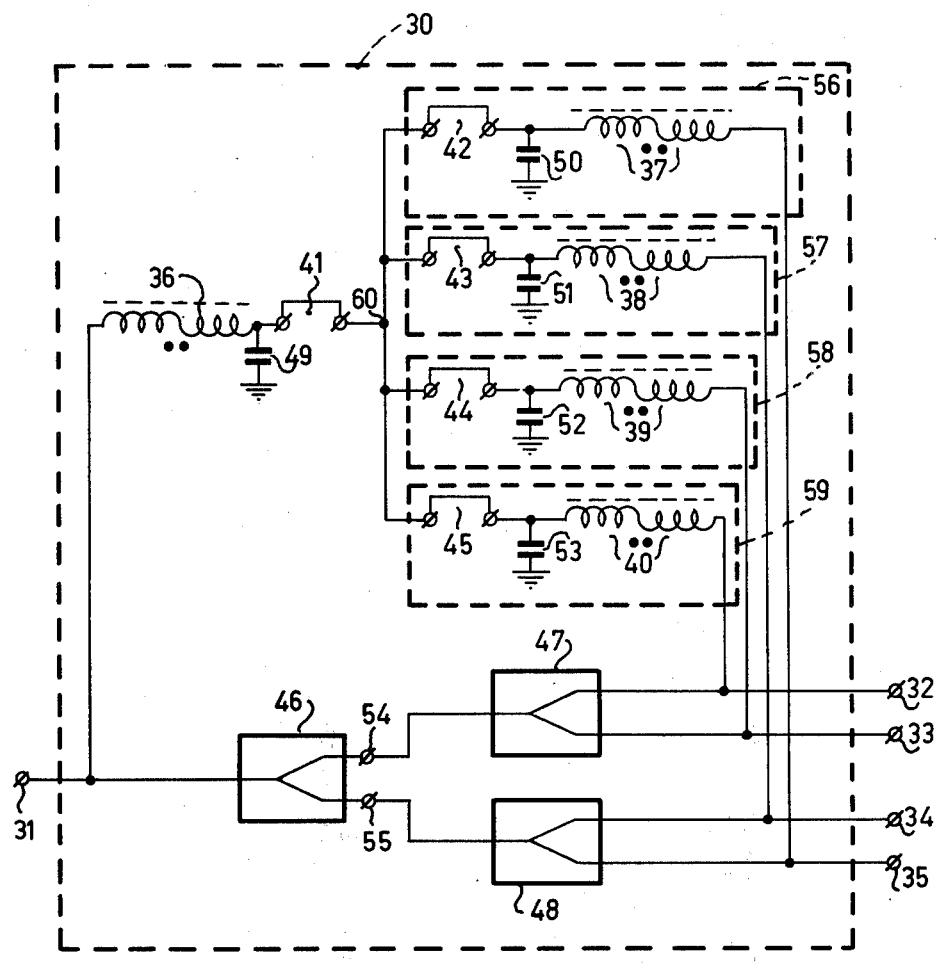
FIG. 2 shows a second embodiment of a HF signal transmission device in which the device comprises a four-way splitter for CATV.

The embodiment shown in FIG. 2 shows a HF signal transmission device 30 having an input terminal 31 and output terminals 32, 33, 34 and 35. The HF transmission path comprises a splitter 46 with a splitter 47 connected to an output terminal 54 and with a splitter 48 connected to an output terminal 55 of the splitter 46. An LF transmission path is present between the input terminal 31 and each of the output terminals 32, 33, 34 and 35. The LF transmission paths comprise an inductance 36 followed by a capacitor 49 which is connected to earth, a switch 41 and four identical circuits 56, 57, 58 and 59 connected at one end to a point 60 and at the other end to the terminals 35, 34, 33 and 32 respectively. Circuit 56 comprises a switch 42 followed by a capacitor 50 which is connected to earth and an inductance 37. The circuits 57, 58 and 59 have, in the same configuration, switches 43, 44 and 45 respectively, capacitors 51, 52 and 53 respectively and inductances 38, 39 and 40 respectively.

The HF signal with the LF supply current is applied to the inductance 36 and the splitter 46 via the input terminal 31. The so-called "3 dB" splitters 46, 47 and 48 have the property that the LF supply current is blocked in both directions and that the HF signal is split into 2 parts of the same energy content. Thus the output terminals 32, 33, 34 and 35 each show a HF signal having an energy content equal to 1/4 of the energy content of the HF signal supplied to terminal 31. The inductance 36 largely blocks the HF signal but allows the LF supply current to pass. This inductance is identical with the inductances 6 and 7 in the HF signal transmission device shown in FIG. 1 and is extensively described in the description of FIG. 1A. The part of the HF signal which is not blocked by the inductance 36 is shortcircuited to earth via the capacitor 49. The LF supply current then passes the switch 41 which is constructed so that the interconnection is cut when a switching part is removed. The part of the LF supply current which is supplied to circuit 56 passes in this circuit the switch 42 and is then supplied to terminal 35 via the inductance 37. In the same manner the HF signals at the terminals 32, 33 and 34 are supplied with the LF supply current via the circuits 59, 58 and 57.

Owing to the symmetrical construction of the LF transmission path relative to the point 60, it is also possible to use, as input terminal for the LF supply current, one of the terminals 32, 33, 34 and 35, using the remaining terminals as output terminals. For example, when the switch 41 is opened and the terminal 33 is used as input terminal for the LF supply current, the terminals 32, 34 and 35 are supplied with the LF supply current. If now, for example, the switch 42 is opened, terminal 35 is no longer supplied with the supply current.

When a HF signal transmission device requires no supply of its own — as for example the embodiment of FIG. 2 — and the feature to switch over the LF supply current transmission paths inside such a device is not required, the latter transmission paths can be realized with one inductance as shown in FIG. 1A instead of two of such inductances having an earthed capacitor connected between them.

Figure 3:
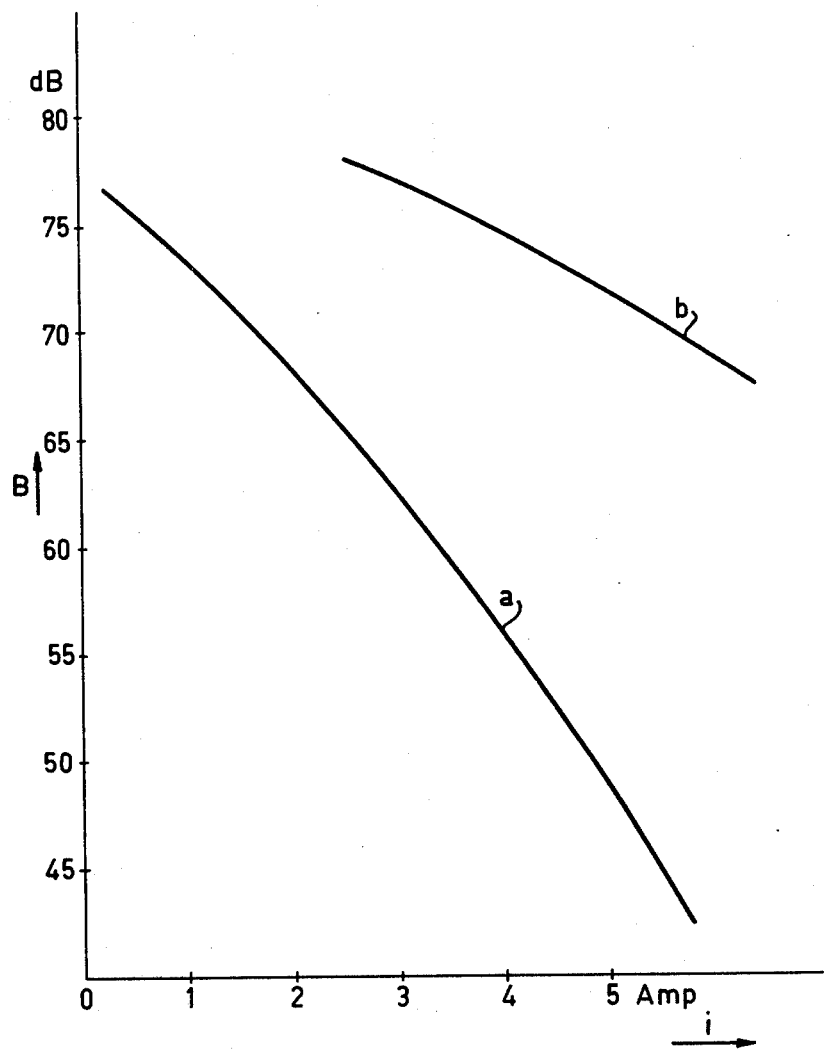
FIG. 3 shows a graph obtained from test results which clearly shows the advantage obtained by the invention as regards the hum modulation.

In FIG. 3 curve $a$ represents the variation of the hum modulation distance B in dB as a function of the coil current $i$ measured in amperes for a device as shown in FIG. 1 with inductances 6 and 7 which are each constructed in the conventional way as a coil of 12 turns wound in one sense on a ferrite core. The hum modulation distance is defined as $-20 \log m$, $m$ being the modulation depth i.e. the ratio between the amplitude of the LF modulating wave and the amplitude of the HF carrier.

Curve $b$ represents the variation of the hum modulation distance as a function of the coil current for a device having an inductance as shown in FIG. 1A. The position of both curves relative to each other clearly shows the advantage achieved by means of this invention. For example, at an LF supply current of 5 amperes, the hum modulation distance measured on a device according to the invention is 72 dB whilst measured in a corresponding manner on a conventional device with coils with 12 turns wound in one sense the hum modulation distance amounted to only 48 dB.

A coil consisting of 2 × 12 turns, wound in one sense on a ferrite core will produce a stronger modulation, the hum modulation distance as a function of the coil current varying according to a curve which will even be below curve $a$.

What is claimed is:

1. A HF signal transmission device having input and output terminals and, between said terminals, HF signal transmission path and a LF supply current transmission path, said HF path including at least one capacitance for blocking said LF supply current, and said LF path comprising, for suppressing the HF signal, a series of at least two pairs of substantially equal coils wound on a non-closed core of a magnetizable material and connected in opposite sense to each other, and a power supply unit connected to the junction point between said coil pairs for tapping hum-free LF supply current.

2. A device as claimed in claim 1, wherein said core has a rodlike configuration.

3. A HF signal transmission device as claimed in claim 1, wherein the two coils in each pair are wound on the core in juxtaposition.

4. A HF signal transmission device as claimed in claim 3, wherein the two coils in each pair are wound in opposite senses and that the two ends of the two coils which face each other are interconnected.

* * * * *